F. B. FARNSWORTH.
CIGAR LIGHTER.
APPLICATION FILED SEPT. 30, 1919.
1,393,888. Patented Oct. 18, 1921.
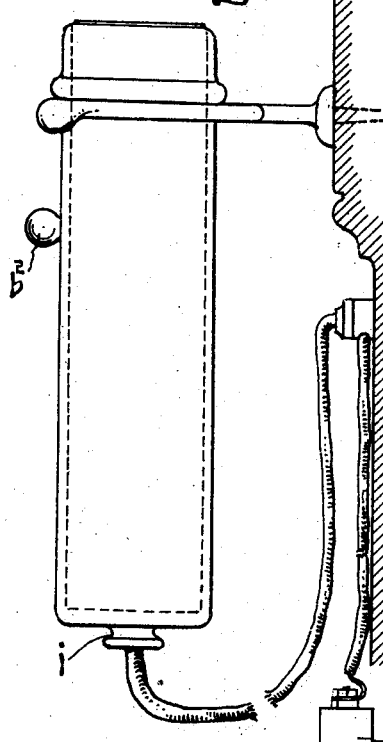
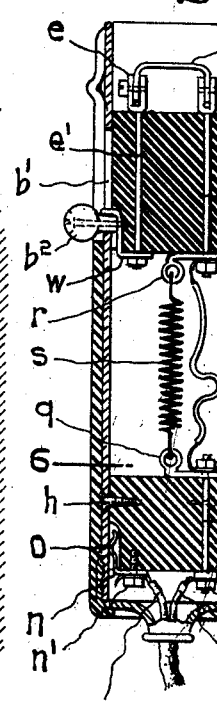
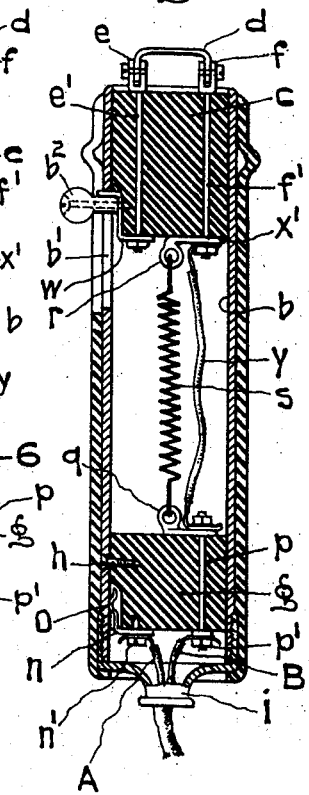
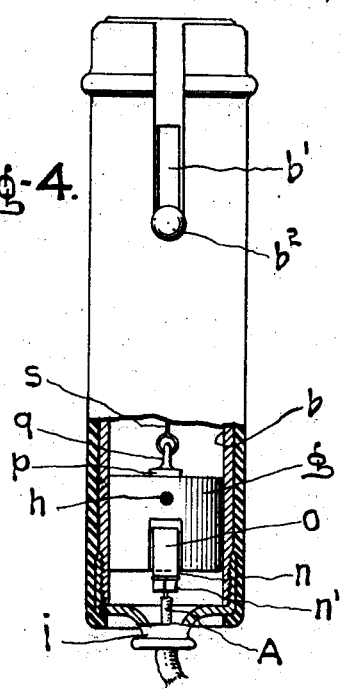
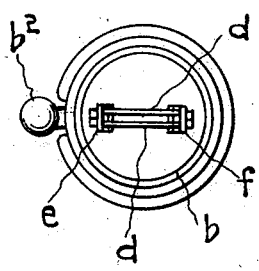
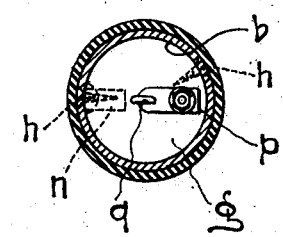
Francis B. Farnsworth,
Inventor.
Attorney.

UNITED STATES PATENT OFFICE.

FRANCIS B. FARNSWORTH, OF MONTREAL, QUEBEC, CANADA.

CIGAR-LIGHTER.

1,393,888.   Specification of Letters Patent.   Patented Oct. 18, 1921.

Application filed September 30, 1919. Serial No. 327,485.

*To all whom it may concern:*

Be it known that I, FRANCIS B. FARNSWORTH, of the city of Montreal, Province of Quebec, Dominion of Canada, a subject of the King of Great Britain, have invented certain new and useful Improvements in Cigar-Lighters; and I do hereby declare that the following is a full, clear, and exact description thereof.

My invention relates particularly to electric cigar lighters, and has for its object to provide a portable device of this nature suitable for use to light cigars or pipes particularly in automobiles. To this end the invention may be said broadly to consist of a handle adapted to be suspended in a motor car and resist damage when subjected to knocks and jars to which it is liable when being handed around in a car or dropped by the person using it, the handle containing and protecting a resistance device adapted to generate the necessary heat for igniting the cigar, such device being movable by the pressure of a finger of the user to expose the same and automatically return it to position within the handle.

For full comprehension, however, of my invention reference must be had to the accompanying drawings in which similar reference characters indicate the same parts, and wherein:

Figure 1 is a fragmentary sectional view of a part of a motor car with my cigar lighter attached;

Fig. 2 is a longitudinal sectional view of the lighter with the igniter in normal position;

Fig. 3 is a similar view to Fig. 2 with the igniter manipulated to igniting position;

Fig. 4 is a side elevation partly in section taken at right angles to Fig. 1;

Fig. 5 is a plan view looking into the igniting end of the lighter; and

Fig. 6 is a transverse sectional view taken on line 6—6 Fig. 2.

It is conceivable that any cigar lighter for use in an automobile must be proof against damage by more or less knocking about and as far as I am aware no lighter has been produced which will serve its purpose under the conditions which my invention is designed to meet. The handle indicated at $b$ is of tubular form and contains slidably therein a block $c$ for insulating material upon which is mounted the igniter indicated at $d$ which consists preferably of a device of high electrical resistance metal secured in sockets $e$ and $f$ on the opposite ends of electrical conductors $e^1$ and $f^1$ extending inwardly through the block and having their inner ends connected respectively to the leads A and B of the storage battery indicated at X. This storage battery may be one specially provided for the cigar lighter or one of the usual ignition or illuminating batteries of a car. The handle has a slot $b^1$ and the block $c$ a finger-piece $b^2$ adapted to be shifted to and fro in the slot. This block $c$ may be so fitted within the tubular handle that it will stay in any position to which it may be moved, and the conductors $e^1$ and $f^1$ may be connected to the leads A and B by many different connections without departing from the spirit of my invention; but I prefer to add solidity to and brace the device by providing a second block $g$ of insulating material in the butt of the handle to which it is connected by screws passed through the tube, the outside surface of which is screw-threaded to receive a cap $i$, while the block $g$ has a conductor $n$ having a spring end $o$, and a conductor $p$ terminating at an eye $q$. The rear ends of these conductors $n$ and $s$ have binding screws $n^1$ and $p^1$ to which the leads A and B are connected. The eye $r$ carried by the inner end of the block $c$ and a helical spring $s$ connects these eyes together. The tubular handle $b$ is either made of brass or other good electrical conducting material with which the spring $o$ makes electrical connection. The conductor $e^1$ has a contact piece $w$ connected thereto and bent upwardly beneath the finger piece $b^2$ to position to be in the front face thereof and make contact with the top of the slot $m$ in the handle when the finger piece is moved to the forward end of such slot, and the conductor $f^1$ has a contact piece $x^1$ connecting it to the eye $r$. This arrangement of electrical connections uses the spring as a conductor. I prefer however, to provide a supplemental conductor $y$ of flexible nature and connected between the two eyes, the flexibility permitting the block $c$ to be moved to its ignited position.

When it is desired to light a cigar or pipe the finger piece is pushed to the forward end of the slot, thus closing the circuit from the battery X through lead A, contact $o$, the handle contact $w$, conductor $e^1$ to igniter $d$ and thence by conductor $f^1$, contact $x^1$, eye $r$, wire $y$ and spring $s$ to eye $q$ and contact $p$ to lead B to the battery. When the finger-piece is released the spring returns the block $c$ and igniter to the interior of the tube.

It is obvious that while the igniter is fully protected by the handle from damage by being knocked about it enables the igniter to be of such form that it may protrude a convenient distance beyond its connections, thus facilitating the lighting of a cigar and even permitting the device to be used to light a pipe.

What I claim is as follows:

1. A lighter comprising a carrier, an insulated plug in the carrier, electrical connections carried by the plug, and including a high resistance igniter exposed at the outer end of the plug, and electrical connections within the carrier and presenting an open circuit including the connection in the plug and manually operated means for closing the circuit.

2. A cigar and pipe lighter for automobiles consisting of a tubular handle having a slot and containing a manually movable plug carrying an electric resistance device for generating the necessary heat for igniting the cigar or pipe, a finger piece on the plug and protruding through the slot in the handle and electrical connections for the resistance device.

3. A portable lighter comprising a handle having a slot near its forward end, a member of insulating material slidably carried within the handle and having a finger piece protruding through the slot, a pair of conductors carried by the member, a device of high electrical resistance connected at its ends to the forward ends of the said conductor, an eye carried by the inner end of the member, a third member of insulating material located in the butt of the handle and having an eye on its forward side, a retractile helical spring connecting together the said eyes, an electrical contact piece connecting one of the conductors to the eye on the movable member, a pair of binding posts upon the butt of the handle, a contact piece carried by the second member and effecting electrical connection between one of the binding posts and the eye upon said second member, the portion of the handle contiguous to the upper end of the slot and extending in the vicinity of the second member being of good electrical conductivity, a second member having an electrical contact effecting connection between the last mentioned conductor and the other binding post, an electrical contact connecting the conductor to the forward side.

4. A portable cigar and pipe lighter comprising a tubular handle having a slot near its forward end, a member of insulating material slidably carried within the handle and having a finger piece protruding through the slot, a pair of conductors carried by the member, a device of high electrical resistance connected at its ends to the forward ends of the said conductors, an eye carried by the inner end of the member, a second member of insulating material located in the butt of the handle and having an eye on its forward side, a retractile helical spring connecting together the said eyes, an electrical contact piece connecting one of the conductors to the eye on the movable member, a pair of contact pieces carried by the second member and effecting electrical connection between the eye and conductors upon said second member, the portion of the handle contiguous to the upper end of the slot and extending to the vicinity of the second member being of good electrical conductivity, a second member having an electrical contact effecting connection between the last mentioned conductor and the other binding screw, an electrical contact connecting the conductor to the forward side, and a supplemental electrical conductor connecting the eyes together.

5. A portable cigar and pipe lighter comprising a tubular handle having a slot near its forward end, a member of insulating material slidably carried within the handle and having a finger piece protruding through the slot, a pair of conductors carried by the member, a device of high electrical resistance connected at its ends to the forward ends of the said conductor, an eye carried by the inner end of the member, a third member of insulating material located in the butt of the handle and having an eye on its forward side, a retractile helical spring connecting together the said eye, an electrical contact piece connecting one of the conductors to the eye on the movable member, a pair of binding posts upon the butt of the handle, a contact piece carried by the second member and effecting electrical connection between one of the binding posts and the eye upon said second member, a second member being of good electrical conductivity, a second member having an electrical contact effecting connection between the last mentioned conductor and the other binding post, an electrical contact connecting the conductor to the forward side,—a supplemental electrical conductor connecting the eyes together, and an electrical conducting wire on the side of the handle and extending from the vicinity of the second member to the forward end of the slot.

In testimony whereof I have signed my name to this specification in the presence of two witnesses.

FRANCIS B. FARNSWORTH.

Witnesses:
HAROLD W. ROBERTS,
WILLIAM J. C. HEWETSON.